US012345343B2

United States Patent
Rodgers et al.

(10) Patent No.: US 12,345,343 B2
(45) Date of Patent: Jul. 1, 2025

(54) ANTI-SEIZE ADJUSTABLE REGULATOR

(71) Applicants: Ian Rodgers, Itasca, IL (US); Moises Contreras Hernandez, Itasca, IL (US)

(72) Inventors: Ian Rodgers, Itasca, IL (US); Moises Contreras Hernandez, Itasca, IL (US)

(73) Assignee: Robertshaw Controls Company, Itasca, IL (US)

( * ) Notice: Subject to any disclaimer, the term of this patent is extended or adjusted under 35 U.S.C. 154(b) by 82 days.

(21) Appl. No.: 18/370,951

(22) Filed: Sep. 21, 2023

(65) Prior Publication Data

US 2024/0102566 A1    Mar. 28, 2024

Related U.S. Application Data

(60) Provisional application No. 63/410,359, filed on Sep. 27, 2022.

(51) Int. Cl.
*F16K 17/06* (2006.01)
*F16H 25/20* (2006.01)

(52) U.S. Cl.
CPC ......... *F16K 17/06* (2013.01); *F16H 25/2015* (2013.01); *F16H 2025/209* (2013.01); *F16K 2200/304* (2021.08)

(58) Field of Classification Search
USPC ........... 251/129.11, 229, 264, 266, 271, 273, 251/284, 265
See application file for complete search history.

(56) References Cited

U.S. PATENT DOCUMENTS

| | | | | |
|---|---|---|---|---|
| 1,578,349 | A * | 3/1926 | Nixon | F16K 3/12 210/534 |
| 5,052,656 | A * | 10/1991 | Katayama | F16K 31/04 251/266 |
| 5,060,910 | A * | 10/1991 | Iwata | F16K 31/04 251/266 |
| 5,851,003 | A * | 12/1998 | Aoki | F16K 31/04 251/264 |
| 5,855,195 | A * | 1/1999 | Oikawa | F02M 26/49 123/339.25 |
| 7,900,888 | B2 * | 3/2011 | Weldon | H02K 7/06 251/267 |
| 8,556,229 | B2 * | 10/2013 | Lv | F16K 31/047 251/264 |
| 8,690,122 | B2 * | 4/2014 | Kato | H02K 7/06 123/568.24 |
| 11,408,516 | B1 * | 8/2022 | Rodgers | F23N 1/00 |
| 2011/0023513 | A1 * | 2/2011 | Hamel | F16K 31/047 62/211 |

* cited by examiner

*Primary Examiner* — Matthew W Jellett
(74) *Attorney, Agent, or Firm* — Miller & Martin PLLC

(57) ABSTRACT

A regulating valve having anti-seize characteristics provides a linear drive system intermediate a drive shaft connected to a motor and a lifter connected to the regulator spring. The linear drive system translates the rotational motion of the drive shaft into preferably, linear only motion of the lifter, thereby preventing binding internal to the valve.

14 Claims, 2 Drawing Sheets

ANTI-SEIZE ADJUSTABLE REGULATOR

CLAIM OF PRIORITY

This application claims the benefit of U.S. Provisional application No. 63/410,359 filed Sep. 27, 2022, which is incorporated herein by reference in its entirety.

FIELD OF THE INVENTION

The present invention relates to gas valves and more particularly to gas valves having an on/off function as well as a gas pressure regulator function.

BACKGROUND OF THE INVENTION

Gas valves often include an on/off function and a gas regulator function. The gas regulator function often include a main diaphragm that may be activated and controlled by a servo regulator or directly by an adjustable spring force. When spring force is utilized, particularly in electrically controlled valves, the spring force can be changed with the use of a stepper motor or other electrically driven motor. The motor can compress the diaphragm spring when turning one direction or release it when turning in the other direction to therefore change the pressure exerted on the diaphragm and thus, the regulator setting.

In many uses, such as with gas cooking valves, these motors do not normally have positional feedback due to cost of such systems, so the motor is often driven into a stop. The starting position is then known so the regulator range can be known and positioned accordingly. Unfortunately, driving motor into a stop has a tendency to have the motor drive screw seize in place. The torque of the motor is then unable to move the drive screw with a consequential loss of adjustability and the valve being stuck in one position. This particular problem can be even worse at elevated temperatures.

One way to address this problem would be to use positional feedback with the motors and associated electronics. Unfortunately, the cost of a feedback system in electronics would significantly increase the costs to the user. Another possibility could be to drive the motor into a stop for a short period of time and then immediately back off the stop. While this could be performed, there are a number of issues. First, one still drives the motor and/or drive screw into the stop where the valve could be stuck. Second, the exact position could be lost as the drive screw might get stuck for some time at the stop and then free itself, or it could back off immediately the full signal amount. Then, the exact position could be somewhere in-between those two positions, if not stuck.

What is needed is a way to consistently position the lifter applying the spring force on the diaphragm so that it does not stick against a hard stop and the position is repeatedly known. Applicant's U.S. Pat. No. 11,408,516 is one way to address this issue. There is believed to be a need for other techniques for at least some applications.

SUMMARY OF THE INVENTION

It is an object of many embodiments of the present invention to provide an improved valve having a lifter with a known position that is not stuck against a hard stop.

It is another object of many embodiments of the present invention to provide an improved gas valve having on/off and regulator functions which has a reduced likelihood of sticking at a hard stop position.

An improved valve can be provided having a drive screw which may be operated by a stepper motor or other appropriate drive system. The drive screw preferably connects to a linear drive system which is preferably comprised of a concentrically disposed worm and gear whereby the driveshaft turns the worm. The gear then moves linerally preferably as constrained by guides. The gear connects to a lifter which is then linerally moved in directions parallel to the driveshaft axis. When driven against the seat and towards a hard stop, the gear either contacts a guide pin base or other structure internally to the valve, or the lifter contacts an adjustment screw which results in the engagement of a drive screw shifted from the front face of the gear back to the back face or into the gap between the worm and gear so that there is no engagement and thus the driveshaft does not become seized due to the effects of the stop as occurs with may prior art designs.

Regardless of the location of the stop, by having the linear movement (absent rotation), a situation of twisting a drive screw component into a hard stop is prevented which could otherwise create a potential seizing situation. The linear movement unexpectedly prevents such a situation.

Accordingly, in accordance with many embodiments of the present invention, an improved valve can be provided to the marketplace.

BRIEF DESCRIPTION OF THE DRAWINGS

The particular features and advantages of the inventions with other objects will become apparent from the following description taken in connection with the accompanying drawings in which.

DETAILED DESCRIPTION OF THE PREFERRED EMBODIMENT

Figure 1:
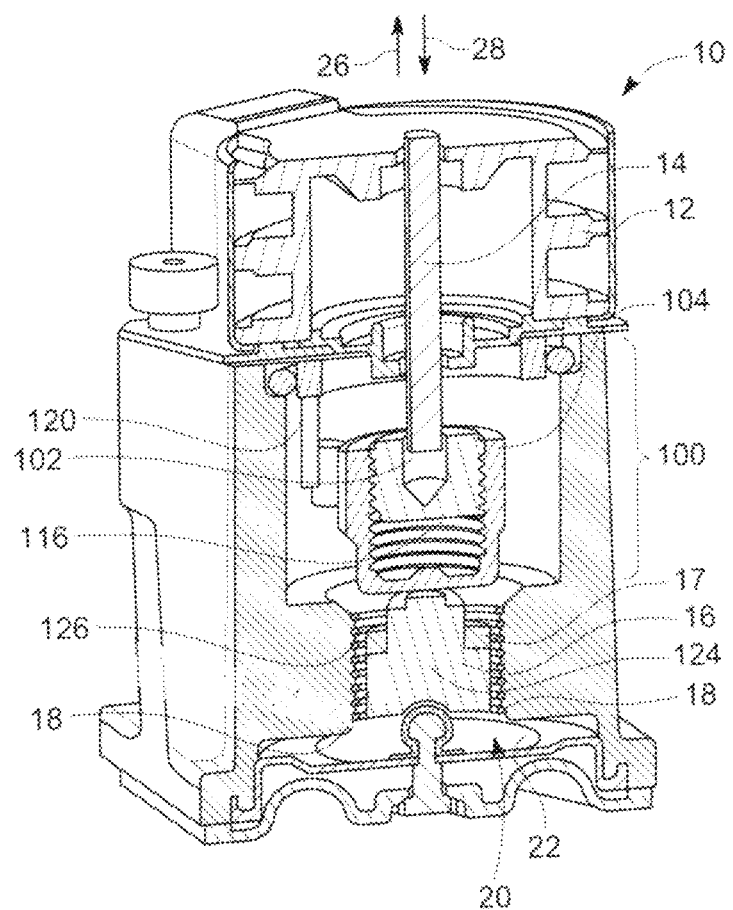
FIG. 1 is a cutaway view of a gas valve of the present preferred embodiment of the present invention.
Figure 2:
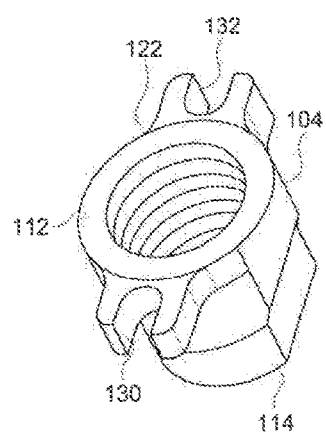
FIG. 2 is a top perspective view of the gear shown in the preferred embodiment of the present invention of FIG. 1.
Figure 3:
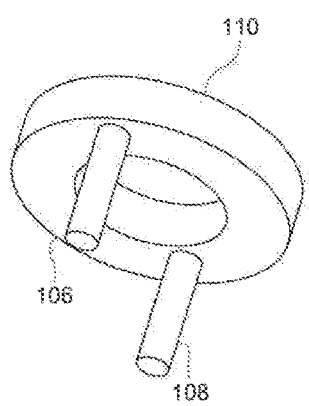
FIG. 3 is a bottom perspective view of the guide pin assembly shown in the preferred embodiment of the present invention as shown in FIG. 1.
Figure 4:
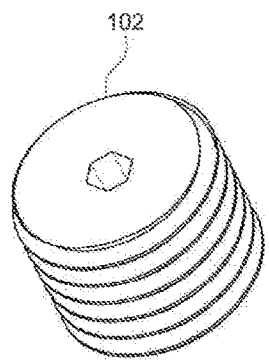
FIG. 4 is a top perspective view of the worm shown in the preferred embodiment of the present invention as shown in FIG. 1.

FIG. 1 shows a preferred embodiment of a gas valve 10. Valve 10 is shown with a stepper motor 12 driving a drive screw 14. The drive screw 14 is connected through a linear drive system 100 to move a lifter 16. The lifter 16 can apply a selected amount of pressure to a spring such as coil spring 18 which provides a pressure force against a regulator 20. This can cause the regulator 20 to unseat from the seat 22 at specific pressures so as to adjust the amount of flow 10 through the inlet/outlet ports (obscured from view) in this view.

The valve 10 also has a position in which the drive screw 14 is backed sufficiently away in the direction 26 so that the regulator 20 seats against the seat 22. Normally for many applications the stepper motor 12 continues to move the drive screws 14 to a back seat or a hard stop position so that the valve 10 has a known position of the lifter 16 and the drive screw 14.

As can be seen from the various embodiments, the coil spring 18 exerts a pressure or force against the regulator 20 in the direction 28 illustrated by arrows or in the direction opposite to the direction 26. The opposite force is applied to the lifters 16.

The applicant is providing an improvement to the valve 10. The linear drive system 100 provides a concentric worm 102 and gear 104 focusing on a single shaft, the drive screw 14 preferably directly connected to the worm 102 to turn the worm 102 to then move the gear 104 linearly in the directions 26, 28 depending on the direction of operation of the stepper motor 12. Guide pins 106, 108, which may connect to a guide pin base 110 prevent the gear 104 from rotating when the worm 102 rotates thereby restricting movement of the gear 104 to linear travel only. Bores or slots 130, 132 in the gear 104 receive the guide pins 106, 108.

This construction has been discovered to have advantages over the prior art. Specifically, when the linear moving gear 104 hits the stop, which could be the guide pin base 110, or the adjustment screw where the lifter 16 makes contact, the engagement of the drive screw 14 shifts from the front face 112 of the gear 104 to the back face 114, or into the gap 116 between the gear 104 and the worm 102, thereby resulting in no engagement. Regardless, the gear 104 is not rotating while moving linerally and therefor does not result in a seizing situation often found with prior art designs.

The anti-seize nature of the valve 10 and its drive screw 14 may also be enhanced with at least some embodiments when the moving components of the drive screw 14 is being driven into the stop 120 with a clockwise motion of the stepper motor 12 but using a left hand thread 122 of the gear 104.

As the gear 104 moves linearly, the lifter 16 may move linearly. The adjusting screw 17 can be positioned relative to threads 26 at a desired location. Thus, the downward force exerted on the stop 120 is released and therefore the drive screw 14 does not become seized in operation. The linear drive system 100 is believed to be an improvement over prior art constructions which required alignment, and be free from inclusions, cavitations and, even if machined to tight tolerances, could still fail under various temperature situations, particularly elevated temperatures. The linear drive system 100 provides a self contained drive which may be manufactured from similar materials. The linear drive system 100 is also self centering, cost effective and quiet in operation. Unexpectedly, the linear drive system 100 is particularly resilient to seizing when driven into a fixed stop 120.

Numerous alterations of the structure herein disclosed will present themselves to those skilled in the art. However, it is to be understood that the present disclosure relates to the preferred embodiment of the invention which is for purposes of illustration only and not to be construed as a limitation of the invention. All such modifications which do not depart from the spirit of the invention are intended to be included within the scope of the appended claims.

Having set forth the nature of the invention, what is claimed herein is:

1. A regulating valve comprising:
   a drive motor coupled to a drive screw;
   a linear drive system operably coupled to the drive screw having a gear driven by a worm connected to the drive screw with the gear restrained by at least one guide to limit movement of the gear to linear movement;
   a lifter operably coupled to the linear drive system;
   a regulator spring continuously applying a first force against the lifter in a first direction against a valve seat and against a regulator in a second direction throughout a range of lifter motion, the first direction being opposite to the second direction; and
   a stop located opposite a portion of the lifter from the regulator spring with the at least one guide extending from the stop towards the lifter, and whereby the linear drive system translates rotational motion of the drive screw to linear motion in the first and second direction without rotation.

2. The regulating valve of claim 1 wherein the linear drive system comprises a worm and a gear.

3. The regulating valve of claim 2 further comprising a guide, said guide restricting the gear to linear motion.

4. The regulating valve of claim 3 further comprising a guide pin base, with the guide extending from the guide pin base.

5. The regulating valve of claim 4 wherein the drive screw stop is a portion of the guide pin base.

6. The regulating valve of claim 3 wherein the worm has one of slots and bores which receive the guide thereby restricting travel of the worm to linear motion only.

7. The regulating valve of 2 wherein the drive screw rotates the gear and the worm is restrained to linear motion.

8. The regulating valve of claim 1 wherein the motor is a stepper motor.

9. The regulating valve of claim 1 further comprising an adjusting member at least selectively acting on the lifter.

10. The regulating valve of claim 9 wherein the adjusting member is a adjusting screw disposed about at least a portion of the lifter.

11. The regulating valve of claim 1 wherein the linear drive system is self contained.

12. The regulating valve of claim 1 wherein the linear drive system is self centering.

13. A regulating valve comprising:
    a drive motor coupled to a drive screw;
    a linear drive system operably coupled to the drive screw having a gear driven by a worm connected to the drive screw with the gear restrained by a guide contacting the gear to limit movement of the gear to linear movement;
    a lifter operably coupled to the linear drive system;
    a regulator spring continuously applying a first force against the lifter in a first direction against a valve seat and against a regulator in a second direction throughout a range of lifter motion, the first direction being opposite to the second direction; and
    a stop located opposite a portion of the lifter from the regulator spring;
    whereby the linear drive system translates rotational motion of the drive screw to linear motion in the first and second direction and the guide assists in limiting rotation of the lifter.

14. A regulating valve comprising:
    a drive motor coupled to a drive screw;
    a linear drive system operably coupled to the drive screw;
    a lifter operably coupled to the linear drive system screw having a gear driven by a worm connected to the drive screw with the gear restrained by at least one guide;
    a regulator spring continuously applying a first force against the lifter in a first direction against a valve seat and against a regulator in a second direction throughout a range of lifter motion, the first direction being opposite to the second direction; and
    a stop located opposite a portion of the lifter from the regulator spring;
    whereby the linear drive system translates rotational motion of the drive screw to linear motion of the gear in the first and second direction of the lifter while preventing rotation being imparted by the drive screw to the lifter and gear.

\* \* \* \* \*